United States Patent
Salgaonkar et al.

(12)

(10) Patent No.: US 11,115,394 B2
(45) Date of Patent: Sep. 7, 2021

(54) METHODS AND SYSTEMS FOR ENCRYPTING DATA FOR A WEB APPLICATION

(71) Applicant: Mastercard International Incorporated, Purchase, NY (US)

(72) Inventors: Rupesh Salgaonkar, Pune (IN); Anup Yedalawar, Pune (IN); Amit Paliwal, Pune (IN); Abhinandan Patil, Pune (IN); Rahul Prakash Kurde, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 244 days.

(21) Appl. No.: 16/507,130

(22) Filed: Jul. 10, 2019

(65) Prior Publication Data

US 2020/0021567 A1 Jan. 16, 2020

(30) Foreign Application Priority Data

Jul. 11, 2018 (SG) .............................. 10201805967S

(51) Int. Cl.
*H04L 29/06* (2006.01)
*H04L 9/08* (2006.01)

(52) U.S. Cl.
CPC ........ *H04L 63/0442* (2013.01); *H04L 9/0825* (2013.01); *H04L 9/0877* (2013.01); *H04L 63/08* (2013.01); *H04L 63/162* (2013.01); *H04L 63/166* (2013.01); *H04L 2209/56* (2013.01)

(58) Field of Classification Search
None
See application file for complete search history.

(56) References Cited

U.S. PATENT DOCUMENTS

| 6,098,056 A * | 8/2000 | Rusnak .............. G06Q 20/3821 705/75 |
| 10,805,276 B2 * | 10/2020 | Zarubin ................ H04L 9/0825 |
| 2006/0168446 A1 * | 7/2006 | Ahonen ................ H04L 9/0822 713/163 |
| 2015/0089244 A1 | 3/2015 | Roth et al. |

(Continued)

OTHER PUBLICATIONS

PCT International Search Report and Written Opinion from PCT Application No. PCT/US2019/035936 entitled Methods and Systems for Encrypting Data for a Web Application (dated Sep. 12, 2019).

(Continued)

*Primary Examiner* — Benjamin E Lanier
(74) *Attorney, Agent, or Firm* — Hovey Williams LLP

(57) ABSTRACT

Embodiments provide methods, and systems for encrypting data for web aplication. A method includes receiving, by a server system, a cryptographic certificate including asymmetric key pair. The method includes generating a random value key that forms at least a part of a Content Encryption Key (CEK) to be generated by a web application. The method includes sending the random value key to a client device running the web application over a secure network communication channel for generating the CEK. The CEK is to be utilized for encrypting a content entered by a user of the web application on the client device and the CEK is encrypted using a public key of the asymmetric key pair for transmission over the secure network communication channel. Furthermore, the method includes translating, the CEK encrypted under public key to CEK encrypted under LMK using a private key being part of the asymmetric key pair.

20 Claims, 9 Drawing Sheets

(56) References Cited

U.S. PATENT DOCUMENTS

2017/0214662 A1\* 7/2017 Chu .................... H04L 63/0823
2017/0237571 A1   8/2017 Pahl et al.
2018/0069840 A1   3/2018 Chilakapati et al.
2018/0276664 A1\* 9/2018 Peng .................... G06Q 20/206

\* cited by examiner

METHODS AND SYSTEMS FOR ENCRYPTING DATA FOR A WEB APPLICATION

CROSS REFERENCE TO RELATED APPLICATIONS

This application claims priority to Singaporean Application Serial No. 10201805967S, filed Jul. 11, 2018, which is incorporated herein by reference in its entirety

TECHNICAL FIELD

The present disclosure relates to cryptographic services facilitated in a client-server architecture and, more particularly to, methods and systems for encrypting data for web application.

BACKGROUND

Data security over the internet has achieved importance today with the tremendous amount of data exchange between various parties. A large part of such data exchange happens over web applications, and there have been constant efforts in providing a secure communication for data exchange over the web applications. Cryptography is a technique to securely send and receive data using encryption and decryption methods, and it aims at preventing any unauthorized access over the network. Cryptography is classified into symmetric key cryptography and asymmetric key cryptography depending on what type of keys are being used for decrypting the data.

Asymmetric key cryptography uses two keys i.e., a public key and a private key which are complementary in function. One such example of the asymmetric key cryptography is Secure Sockets Layer (SSL) which is a standard security protocol for establishing encrypted links between a web server and a browser in an online communication. A web page should use encryption when it expects users to submit confidential data, including personal information, passwords, or credit card details. An SSL certificate is necessary to create SSL connection. The SSL certificate is issued based on authentication of the public key received from the client. Many times it happens that the SSL certificate is not issued by a trusted certification authority (CA). Further, the cryptographic keys that are used to set up the SSL connection between web clients and their web application servers are stored in the same web application servers which may be usually unsecured platforms. Thus, cryptographic keys that are stored on the same web server are vulnerable to theft and misuse. The encrypted data are only as safe as the cryptographic keys that protect the encrypted data. Further, SSL encryption may not be sufficient for highly secure data as the purpose behind SSL technology is not to hide data or make it inaccessible. Its purpose is to scramble or encrypt information.

Accordingly, there is a need for techniques that enable safe and secure data transmissions between the web application and the application server under the SSL pipeline.

SUMMARY

Various embodiments of the present disclosure provide systems, methods, electronic devices and computer program products to encrypt data for a web application.

In an embodiment, a computer-implemented method is disclosed. The method includes generating, by a server system, a cryptographic certificate. The cryptographic certificate includes an asymmetric key pair. The method includes generating a random value key. The random value key forms at least a part of a Content Encryption Key (CEK) to be generated by a web application. Moreover, the method includes sending the random value key to a client device running the web application over a secure network communication channel for generating the CEK. The CEK is to be utilized for encrypting a content entered by a user of the web application on the client device and the CEK is encrypted using a public key being part of the asymmetric key pair for transmission over the secure network communication channel. Furthermore, the method includes translating the CEK encrypted under public key to CEK encrypted under LMK using a private key being part of the asymmetric key pair.

In another embodiment, a server system is provided. The server system includes a communication interface configured to establish a secure network communication channel with a client device running a web application. The server system includes a hardware security module configured to generate a cryptographic certificate. The cryptographic certificate includes an asymmetric key pair. The hardware security module is further configured to generate a random value key forming at least a part of a Content Encryption Key (CEK) to be generated by the web application. Furthermore, the hardware security module is configured to translate the CEK encrypted under public key to CEK encrypted under LMK using a private key being part of the asymmetric key pair. The server system further includes a memory comprising executable instructions and a processor communicably coupled to the communication interface. The processor is configured to execute the instructions to cause the server system to at least send the random value key to a client device running the web application over the secure network communication channel for generating the CEK. The CEK is to be utilized for encrypting a content entered by a user of the web application on the client device and CEK is encrypted using a public key being part of the asymmetric key pair for transmission over the secure network communication channel.

In yet another embodiment, a computer-implemented method is disclosed. The method includes generating, by a web application running on a client device, a self-generated key. The method includes concatenating the self-generated key with a random value key to generate an intermediate key. The random value key is received from a server system. Moreover, the method includes creating a hash value of the intermediate key using a hashing algorithm. The method includes generating a CEK by randomly selecting a predefined length key from the hash value of the intermediate key. The method includes encrypting a content under the CEK. The method includes encrypting the CEK using a public key being part of an asymmetric key pair for transmission over the secure network communication channel to the server system, wherein the public key is retrieved from a cryptographic certificate sent by the server system.

BRIEF DESCRIPTION OF THE FIGURES

For a more complete understanding of example embodiments of the present technology, reference is now made to the following descriptions taken in connection with the accompanying drawings in which.

Figure 1:
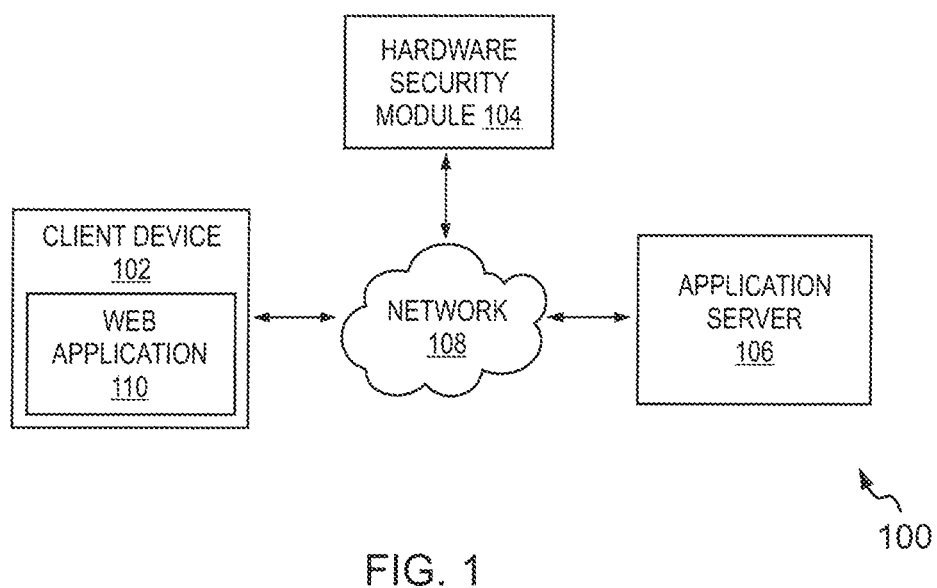
FIG. 1 illustrates an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

OVERVIEW

Various example embodiments of the present disclosure provide methods, systems, user devices and computer program products for encrypting data for a web application.

In various example embodiments, the present disclosure facilitates encryption of a content under a content encryption key (CEK) using a symmetric encryption at a web client. The content is entered using a web application running on a client device. Some non-exhaustive examples of the content include login ID, password, PIN, Card Verification Value (CVV), payment card details or any payment related data that is sensitive enough for a misuse by a third party if retrieved during transmission from the web application to the corresponding application server.

In one embodiment, the CEK is generated by the web application. The CEK includes at least two components: a random value key and a self-generated key by the web application. The random value key and the self-generated key are concatenated to generate an intermediate key. A hash value of the intermediate key is created using a hashing algorithm. The CEK is generated by randomly selecting a predefined length key from the hashed value of the intermediate key. In one embodiment, the random value key is generated by a Hardware Security Module (HSM) for sending it to the application server which further forwards it to the web application running on the client device.

In one embodiment, the server system facilitates encryption of the CEK using an asymmetric encryption. The HSM generates a cryptographic certificate that includes asymmetric key pair to be sent to the application server of the web application. The CEK is encrypted using a public key being a part of the asymmetric encryption. The public key is bound to the cryptographic certificate. The application server (an example of the server system) is configured to validate the cryptographic certificate based on one or more parameters. Some non-exhaustive examples of the one or more parameters include validity of a start date and an end date of the cryptographic certificate, validity of a certificate chain up to a subordinate certificate authority, validity of certificate extension, a certificate revocation list (CRL), an Online Certificate Status Protocol (OCP), a key usage frequency, and validity of a distributed name.

The private key being a part of the asymmetric encryption is stored securely in the HSM. Such a double layered encrypted content is sent from the web client to the application server over a secure network communication channel. Examples of secure network communication channel include Secure Socket Layer (SSL) protocol and Transport Layer Security (TLS) protocol.

In one embodiment, the translation of the encrypted CEK is performed by the HSM. The HSM receives the encrypted CEK from the application server again using SSL/TSL/other type of network protocol. The encrypted CEK is translated under a Local Master Key (LMK) using a private key being a part of the asymmetric encryption. The translated CEK i.e. CEK encrypted under the LMK is used either to decrypt the content or to an offset of the content. The offset is used for validation of the content encrypted by the web client and sent to the application server. Once the original offset matches with the obtained offset, the server system sends the confirmation to the web application.

FIG. 1 illustrates an exemplary representation of an environment 100 related to at least some example embodiments of the present disclosure. In the illustrated environment 100, a client device 102 is shown. Examples of the client device 102 include, but are not limited to, a smartphone, a tablet, a personal digital assistant (PDA), a notebook, or any electronic device having the capability to allow installation of third party applications and communicate with other devices via a network 108. For example, the client device 102 may be a computer including a web browser, such that an application server 106 is accessible to the client device 102 using the Internet. The client device 102 is seen to be in operative communication with a Hardware Security Module (HSM) 104 and the application server 106 (combinedly referred to as server system) via the network 108. In some cases, the HSM 104 and the application server 106 can be a single entity i.e. embodied within a single server system. The HSM 104 and the application server 106 can be example of a logical server system built on cloud computing platform. Alternatively, the HSM 104 and the application server 106 may be located at different facilities of entities managing them separately.

In an embodiment, the application server 106 hosts an application such as a web application 110 (hereinafter referred to as an application 110) to be used by various users. Some non-exhaustive examples of the application 110 include a payment transaction application, an authentication application, a loyalty program application, a digital wallet application and an e-commerce application. The API and other components of the application 110 rest on the application server 106. The application 110 can be made available at application stores such as Google playstore managed by Google®, Apple App store managed by Apple®, etc. The application 110 can be downloaded from the application stores, or from other sources such as web links and storage locations, to devices such as the client device 102. The application 110 is a set of computer executable codes configured to perform functions inherently configured in the application 110. The set of computer executable codes may be stored in a non-transitory computer-readable medium of the client device 102 so as to access the application 110 from the application server 106. The application 110 installed on the client device 102 facilitates an application interface (not shown in FIG. 1) on the client device 102 to enable communication with the application server 106. Alternatively, in some embodiments, the application 110 may be factory installed within the client device 102 associated with the end-user and, as such, the end-user may not need to explicitly request the application 110 from the application server 106.

In an example embodiment, the application 110 may be a payment transaction application. Accessing the payment transaction application may redirect the client device 102 to establish a connection/session with the application server 106 for data communication.

The application server 106 can take example of any server which is the administrative part of the application 110 and which stores data sent from the client device 102. In an example, the application server 106 may be associated with a financial institution such as an "issuer bank" or "issuing bank" or simply "issuer" or simply "bank", in which a user operating the client device 102 may have an issuer account. The application server 106 is responsible for managing information of the user. The application server 106 includes an issuer database (not shown) for maintaining information such as one or more issuer accounts of the user, transaction history related information, permanent account number (PAN) with which the one or more issuer accounts are linked, etc.

Additionally or alternatively, the application server 106 may be associated with a merchant or a Point of Sale (POS) system network. For example, the application server 106 may be associated with an "acquirer bank" or "acquiring bank" or simply "acquirer", in which a user operating the client device 102 may have an acquirer account.

Additional non-limiting examples of the application server 106 may be a digital wallet server, a cryptographic server and a payment server managed by payment cards issuing authorities and/or a payment server associated with a payment interchange network (not shown). Examples of payment interchange network include, but are not limited to, Mastercard® payment system interchange network. The Mastercard® payment system interchange network is a proprietary communications standard promulgated by Mastercard® International Incorporated for the exchange of financial transaction data between financial institutions that are members of Mastercard® International Incorporated. (Mastercard is a registered trademark of Mastercard International Incorporated located in Purchase, N.Y.).

In another example, the application server 106 and the HSM 104 may be managed by the same entity. For example, the application server 106 and the HSM 104 may be managed by a financial institution such as an issuer bank, or by a payment interchange network such as Mastercard® payment system interchange network. In yet another example, both of the application server 106 and the HSM 104 may be managed by a merchant, a POS system network or by a digital wallet server.

The client device 102, the application server 106 and the HSM 104 may communicate with one another via the communication network 108. The communication network 108 may be a centralized network or may comprise a plurality of sub-networks that may offer a direct communication or may offer indirect communication between the client device 102, the application server 106 and the HSM 104. Examples of the communication network 108 may include any type of wired network, wireless network, or a combination of wired and wireless networks. A wireless network may be a wireless local area network ("WLAN"), a wireless wide area network ("WWAN"), or any other type of wireless network now known or later developed. Additionally, the communication network 108 may be or include the Internet, intranets, extranets, microwave networks, satellite communications, cellular systems, personal communication services ("PCS"), infrared communications, global area networks, or other suitable networks, etc., or any combination of two or more such networks.

In an example scenario, if the application 110 is a typical payment transaction application, the client device 102 accesses the application 110 to initiate a payment transaction. Accessing the application 110 may redirect the client device 102 to establish a connection/session with the application server 106 for data communication under a secure network communication channel established according to Secure Socket Layer (SSL) protocol. In an example embodiment, the payment transaction application may be configured to display various form fields (not shown) to be filled by the user such as a payment card number (e.g., xxxx where 'x' is an integral number) of the payment card, expiry date (e.g., MM/YY, month and year of expiry), Card Verification Value (CVV) number (e.g., *** where * is an integral number) and the like which may need extra layer of protection under SSL based transmission. This may be the case when the HSM 104 and the application server 106 can both be accessed via a single application i.e. a payment transaction application.

Since there is an extra layer of protection for data communication between the application 110 and the application server 106, the risk of data (hereinafter alternatively referred to as content) breach reduces tremendously. In existing (conventional) encryption methods, (i.e., not in accordance with the present disclosure), the content entered by user on the web browser is only encrypted according to SSL protocol or TLS protocol which can be decrypted easily or may be compromised at the source itself. Further, the HSM is used generally for CVV validation in payment industry. In contrast to existing encryption methods, by using the embodiments of the present disclosure, the content is protected using a combination of symmetric and asymmetric encryption facilitated by the HSM 104 and thereafter transmitted using SSL protocol which gives additional layers of protection. Some non-exhaustive example embodiments of encrypting data for the application 110 and securely transmitting the data to the application server 106 are described with reference to the following description, particularly with reference to FIGS. 2 to 10.

Figure 2:
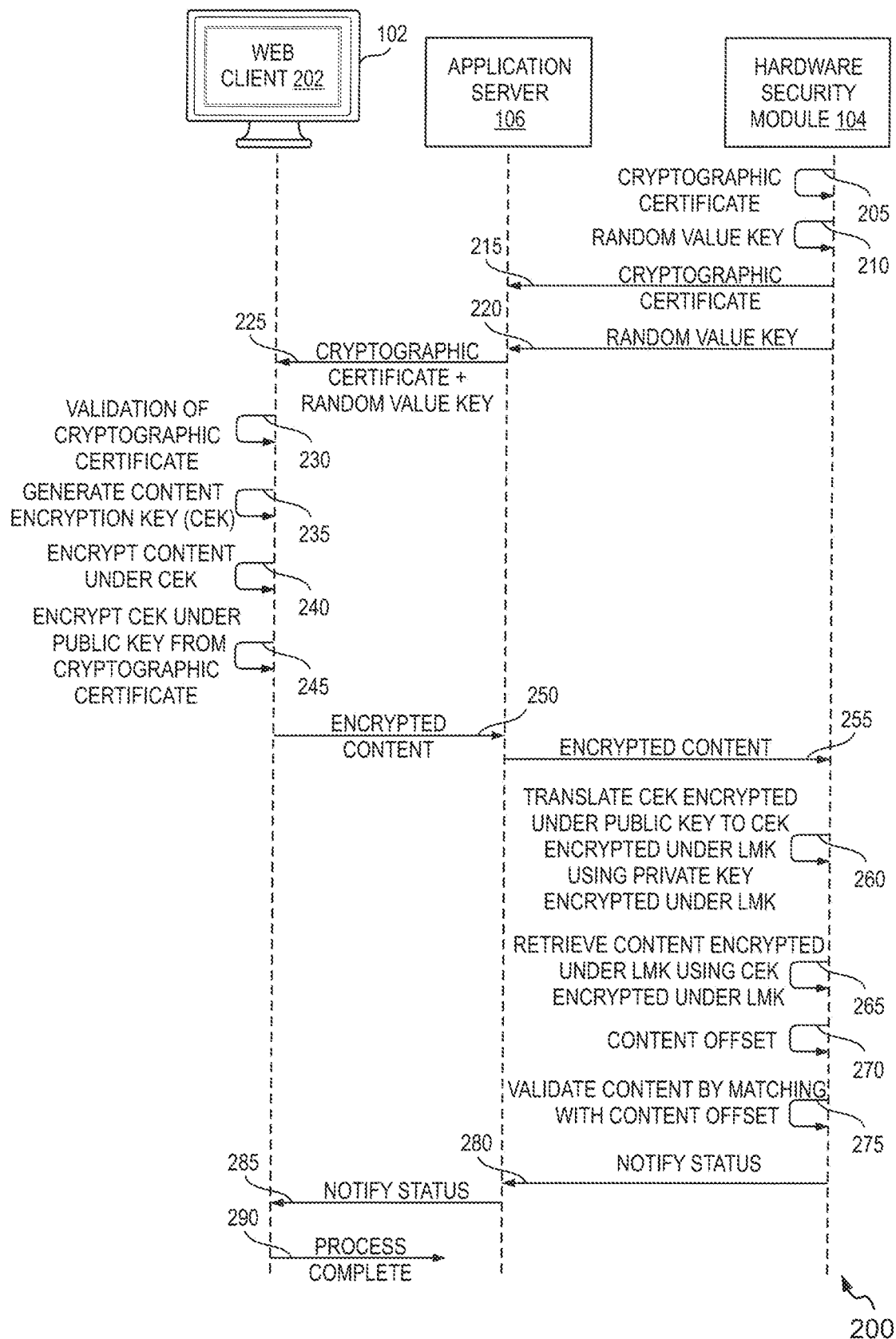
FIG. 2 represents a sequence flow diagram representing a content encryption and decryption, in accordance with an example embodiment.

FIG. 2 represents a sequence flow diagram 200 representing a content encryption and decryption, in accordance with an example embodiment. The sequence of operations of the flow diagram 200 may not be necessarily executed in the same order as they are presented. Further, one or more operations may be grouped together and performed in form of a single step, or one operation may have several sub-steps that may be performed in parallel or in sequential manner.

In an example embodiment, a web client 202 operating within a web browser installed on a client device (e.g., the client device 102) for entering the content (such as a password) to be protected, is shown. The web client 202 is an example of the web application 110.

At 205, the HSM 104 generates a cryptographic certificate. The cryptographic certificate includes a public key and a private key. The HSM 104 is further configured to encrypt the private key under a Local Master Key (LMK) and store it for future decryption processes. At least one person from a Key Management Service (KMS) team may enable an authorization mode of the HSM 104 to generate the asymmetric key pair. In an embodiment, the web client 202 uses the public key to send data to the HSM 104 via the application server 106. In an example embodiment, the asymmetric key pair is not generated per session, and rather the key rotation is tied to the cryptographic certificate such that a predefined number of shared public keys are reused after every predefined time interval.

At 210, the HSM 104 generates a random value key (e.g., z1). In an example embodiment, the application server 106 sends a request to the HSM 104 to generate the random value key. The random value key may be 16 byte long. In at least one embodiment, z1 is later used for generating a content encryption key at the web client 202.

At 215, the HSM 104 sends the cryptographic certificate to the application server 106. The cryptographic certificate includes the public key part of the asymmetric key pair to be used by the web client 202 for encryption of the content being entered by the user. At 220, the HSM 104 sends the random value key to the application server 106.

At 225, the application server 106 sends the cryptographic certificate and the random value key to the web client 202. In an embodiment, when a user enters the application host Uniform Resource Locator (URL) in the web browser of the client device 102, the URL request gets forwarded to the corresponding application server 106 for loading the data to be presented in the application. The application server 106 provides an initial response to the web client 202. The initial response includes the cryptographic certificate and the random value key generated by the HSM 104.

At 230, the web client 202 validates the cryptographic certificate based on one or more parameters. Some non-exhaustive examples of the one or more parameters include validity of a start date and an end date of the cryptographic certificate, validity of a certificate chain up to a subordinate certificate authority, validity of certificate extension, a certificate revocation list (CRL), an Online Certificate Status Protocol (OCP), and a key usage frequency and validity of a distributed name. Upon successful validation of the cryptographic certificate only, the encryption process proceeds further. Further, the public key is retrieved from the cryptographic certificate by the web client 202 only after validation of the cryptographic certificate. In another example embodiment, the application server 106 and the web client 202 both validate the cryptographic certificate and upon successful validation, the public key is retrieved by the web client 202.

At 235, a Content Encryption Key (CEK) is generated. In an embodiment, a self-generated key (z2) is generated by the web client 202 forming at least a part of the CEK. The self-generated key (z2) is concatenated with the random value key (z1) (e.g., z1 obtained at operation 235 from the application server 106) to generate an intermediate key (z3). A hash value (e.g., Sha1(z3)) of the intermediate key (z3) is created using a hashing algorithm such as a Sha1 or Sha3 algorithm. A predefined length key is randomly selected from the hashed value of the intermediate key (Sha1(z3)). The parity is adjusted and the final value is considered as the CEK. In an example embodiment, the self-generated key is 16 byte long, the intermediate key (z3) is 32 byte long and the predefined length key i.e. CEK is 16 byte long. In at least one embodiment, the CEK is generated using symmetric encryption.

At 240, a content to be protected is encrypted under the CEK. The content is entered by the user using the web client 202. Some non-exhaustive examples of the content include a password, a PIN, a CVV number and the like. The content can be any data that needs to be sent to the application server 106 over a network communication channel.

At 245, the CEK is encrypted by the web client 202 using the public key retrieved from the cryptographic certificate.

At 250, the encrypted content is sent to the application server 106 under a secure network communication channel. The secure network communication channel can be according to the SSL protocol. When the encrypted content reaches the application server 106, the transmission pipeline cannot be compromised by a third party because the private key is securely stored in the HSM 104 under the LMK and therefore only the HSM 104 can decrypt the encrypted content. Additionally, the application server 106 also validates the cryptographic certificate by retrieving data from the SSL message received from the web client 202.

At 255, the application server 106 sends the encrypted content to the HSM 104 for decryption. The HSM 104 may be physically connected to the application server 106 or may be in a remote entity.

At 260, the HSM 104 translates the CEK encrypted under public key to CEK encrypted under LMK using a complementary private key stored therein. The HSM 104 includes an identifier of an encryption algorithm used by the web client 202 for encrypting the CEK under public key.

At 265, the HSM 104 retrieves the content encrypted under LMK using the CEK encrypted under LMK.

At 270, the HSM 104 decrypts the content encrypted under LMK to generate an offset i.e. a content offset. At 275, the HSM 104 validates the original content by matching with the content offset. At 280, the HSM 104 sends the status notification to the application server 106. If the offset matches with the original content, the HSM 104 sends successful message. If the offset doesn't match with the original content, the HSM 104 sends the failure message to the application server 106. At 285, the application server 106 sends the status notification to the web client 202. The process completes at 290. Thus, a technical effect of a content encryption completed using symmetric and asymmetric encryption methods is a secure content transmission from the web client 202 to the application server 106. Such encrypted content is further sent using SSL protocol which adds to one more layer of the security. One specific example of a secure communication of a sensitive content is explained with reference to FIG. 3.

Figure 3:
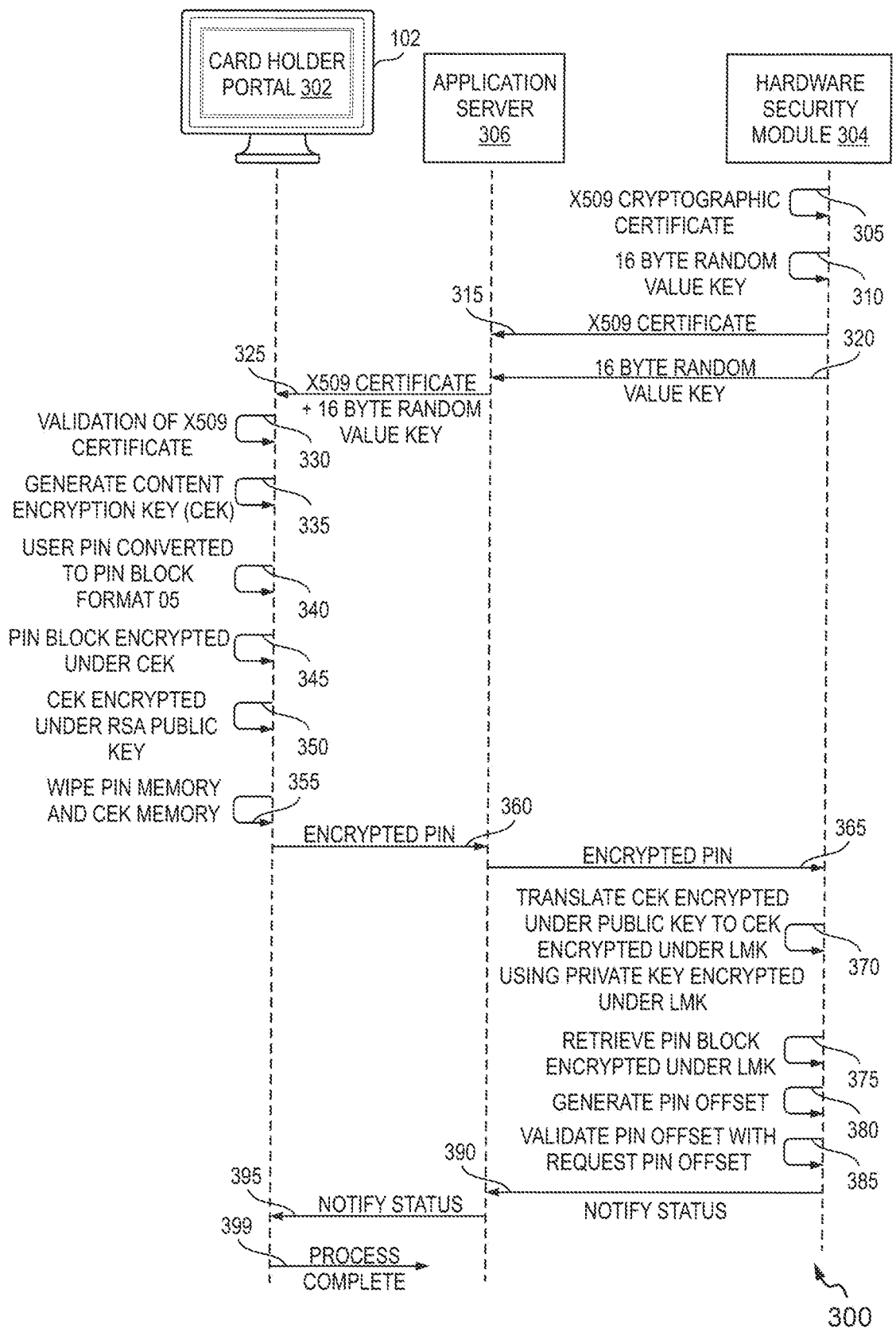
FIG. 3 represents a sequence flow diagram representing a Personal Identification Number (PIN) encryption and decryption, in accordance with an example embodiment.

FIG. 3 represents a sequence flow diagram 300 representing a Personal Identification Number (PIN) encryption and decryption, in accordance with an example embodiment. The sequence of operations of the flow diagram 300 may not be necessarily executed in the same order as they are presented. Further, one or more operations may be grouped together and performed in form of a single step, or one operation may have several sub-steps that may be performed in parallel or in sequential manner.

At 305, the HSM 304 (e.g., payShield 9000) generates a cryptographic certificate such as including but not limited to cryptographic certificate X.509. X.509 is a standard that defines the format of public key certificates. X.509 certificates are used in many Internet protocols, including TLS/SSL and the secure protocol for browsing the web. In an embodiment, the HSM 304 is a tamper resistant device. In one non-limiting example, the asymmetric key pair is generated using Rivest-Shamir-Adleman (RSA) algorithm. The RSA algorithm involves operations such as key generation, key distribution, encryption and decryption. The HSM 304 is further configured to encrypt the RSA generated private key under a Local Master Key (LMK) and to store it for future decryption processes. In an embodiment, X.509 certificate is generated by signing a certificate signing request using the private key of the asymmetric key pair. Further, distribution of the certificate is done only after client authentication. In an embodiment, the web client 202, for example a cardholder portal 302 (hereinafter referred to as the CHP 302) uses the public key to send data to the HSM 304 via an application server 306. The CHP 302 may be an example of the payment transaction application.

At 310, the HSM 304 generates a random value key (y1). In an example embodiment, the application server 306 sends a request to the HSM 304 to generate the random value key (y1). The random value key (y1) may be 16 byte long, and y1 is later used for generating a content encryption key at the CHP 302.

At 315, the HSM 304 sends X.509 certificate to the application server 306. The X.509 certificate includes the public key part of the asymmetric key pair to be used by the CHP 302 for encryption of the CEK generated by the CHP 302. At 320, the HSM 304 sends the random value key to the application server 306.

At 325, the application server 306 sends X.509 certificate and the random value key to the CHP 302. In an embodiment, when a user enters the CHP URL (e.g., www.cardholderxyz.com) in the web browser of a client device, the URL request gets forwarded to the corresponding application server 306 for loading the data to be presented. In an embodiment, the communication occurs according to HTTP Strict Transport Security (HSTS). HSTS is a web security policy mechanism that helps to protect websites against hijacking. The application server 306 provides an initial response to the CHP 302. The initial response includes the X.509 certificate and the random value key generated by the HSM 304.

At 330, the CHP 302 validates the X.509 certificate based on one or more parameters as explained with reference to FIG. 2. Upon successful validation of the X.509 certificate only, the encryption process proceeds further. Further, the RSA generated public key is retrieved from the X.509 certificate by the CHP 302 only after validation of the X.509 certificate.

At 335, a content encryption key (CEK) is generated by the web client 202 as explained with reference to FIG. 2. An example of the CEK is a Zone Pin Key Internet (ZPK-Internet). In an embodiment, a self-generated key (y2) is generated by the CHP 302 forming at least a part of the CEK. The self-generated key (y2) is concatenated with the random value key (y1) (e.g., generated by the HSM 304) to generate an intermediate key (y3). A hash value (e.g., Sha3(y3)) of the intermediate key (y3) is created using a hashing algorithm such as Sha3 algorithm. A predefined length key is randomly selected from the hashed value of the intermediate key (Sha3(y3)). The parity is adjusted and the final value is considered as the CEK. This is explained in detail with reference to FIG. 4.

At 340, a Personal Identification Number (PIN) entered by a user on the CHP 302 is converted into a PIN block (e.g., Pin Block format 05). The PIN block format 05 can exemplarily be represented as '141234FFFFFFFFFF'. To protect the PIN during transmission from the PIN entry device i.e. the CHP 302, the PIN is encoded into a PIN block which is further encrypted by an algorithm such as a triple data encryption algorithm, RSA, advanced encryption standard and the like. In an embodiment, for the content other than PIN, the HSM 304 may be configured with different commands accordingly for implementation.

At 345, the PIN Block is encrypted under CEK by the CHP 302. The PIN block encrypted under CEK may exemplarily be represented as 'CE8249625379DD26'. At 350, the CEK is encrypted by the CHP 302 using the public key retrieved from the X.509 certificate. At 355, PIN block memory and CEK memory are wiped from the CHP 302 for ensuring the extra level of security.

At 360, the encrypted PIN block is sent to the application server 306 under a secure network communication channel such as SSL protocol. At 365, the application server 306 sends the encrypted PIN to the HSM 304 for translation. At 370, the HSM 304 translates CEK (or ZPK-Internet) encrypted under public key to CEK encrypted under LMK using private key encrypted under LMK. At 375, the HSM 304 retrieves the PIN block encrypted under the LMK from the CEK.

At 380, the HSM 304 uses the PIN block encrypted under LMK to generate a PIN offset. The PIN offset may exemplarily be represented as '8499FFFFFFFF'. At 385, the HSM 304 validates the original PIN offset (or request PIN offset) by matching with the generated PIN offset. At 390, the HSM 304 sends the status notification to the application server 306. At 395, the application server 306 sends the status notification to the CHP 302. The process completes at 399. Thus, as the CEK (e.g., ZPK-internet) is generated on client side i.e. on the CHP 302, the application developer or the application server 306 are not capable of knowing the clear ZPK-Internet. When the encrypted PIN block reaches the HSM 304, the HSM 304 translates the CEK under RSA public key to retrieve the CEK encrypted under LMK. Therefore, the tunnel between the CHP 302 and the HSM 304 cannot be broken any time.

Figure 4:
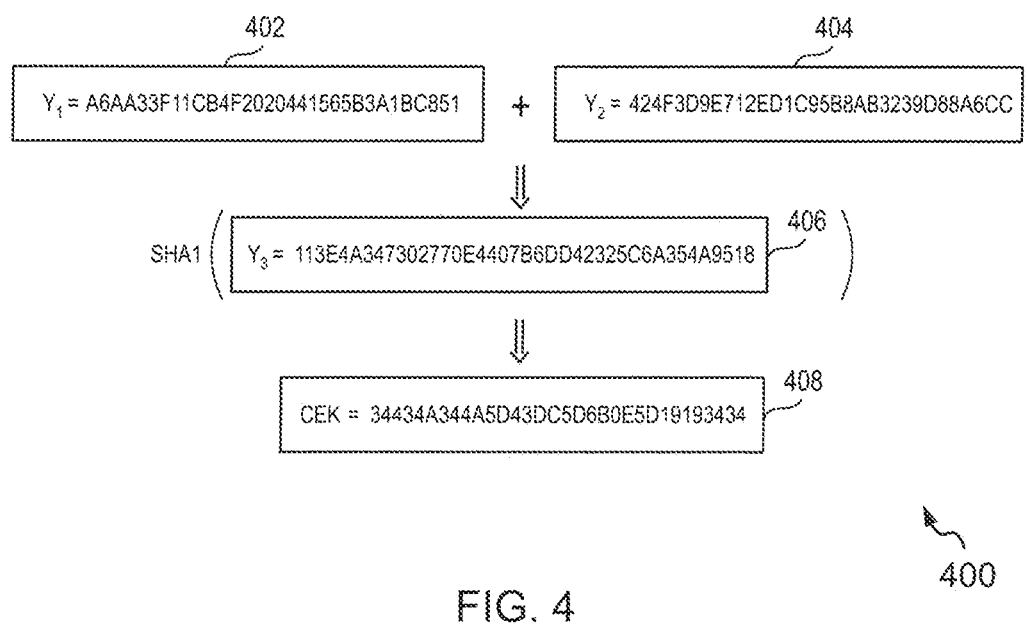
FIG. 4 shows a simplified representation of generation of a content encryption key, in accordance with an example embodiment.

FIG. 4 shows a simplified example representation 400 of generation of a content encryption key, in accordance with an example embodiment. More specifically, FIG. 4 explains step 335 of FIG. 3 in detail. A Zone Pin Key Internet (ZPK-Internet) is an example of the CEK to be generated by the web client (e.g., the CHP 302). A self-generated key (y2)

(see, 404) is generated by the CHP 302 forming at least a part of the ZPK-Internet. y2 is exemplarily depicted as '424F3D9E712ED1C95B8AB3239D88A6CC'. The self-generated key (y2) (see, 404) is concatenated with the random value key (y1) (see, 402) (generated by the HSM 304) to generate an intermediate key (y3). y1 is exemplarily depicted as 'A6AA33F11CB4F2020441565B3A1BC851'. A hash value (e.g., Sha1(y3) or Sha3(y3)) (see, 406) of the intermediate key (y3) is created using a hashing algorithm such as Sha1 algorithm. Sha1(y3) (see, 406) is exemplarily depicted as '113E4A347302770E4407B6DD42325C6A354A9518'. A predefined length key is randomly selected from the hashed value of the intermediate key (Sha1(y3)). After adjusting the parity of the predefined length key, the ZPK-Internet (see, 408) is generated. The ZPK-Internet is exemplarily depicted as '34434A344A5D43DC5D6B0E5D19193434'.

Figure 5:
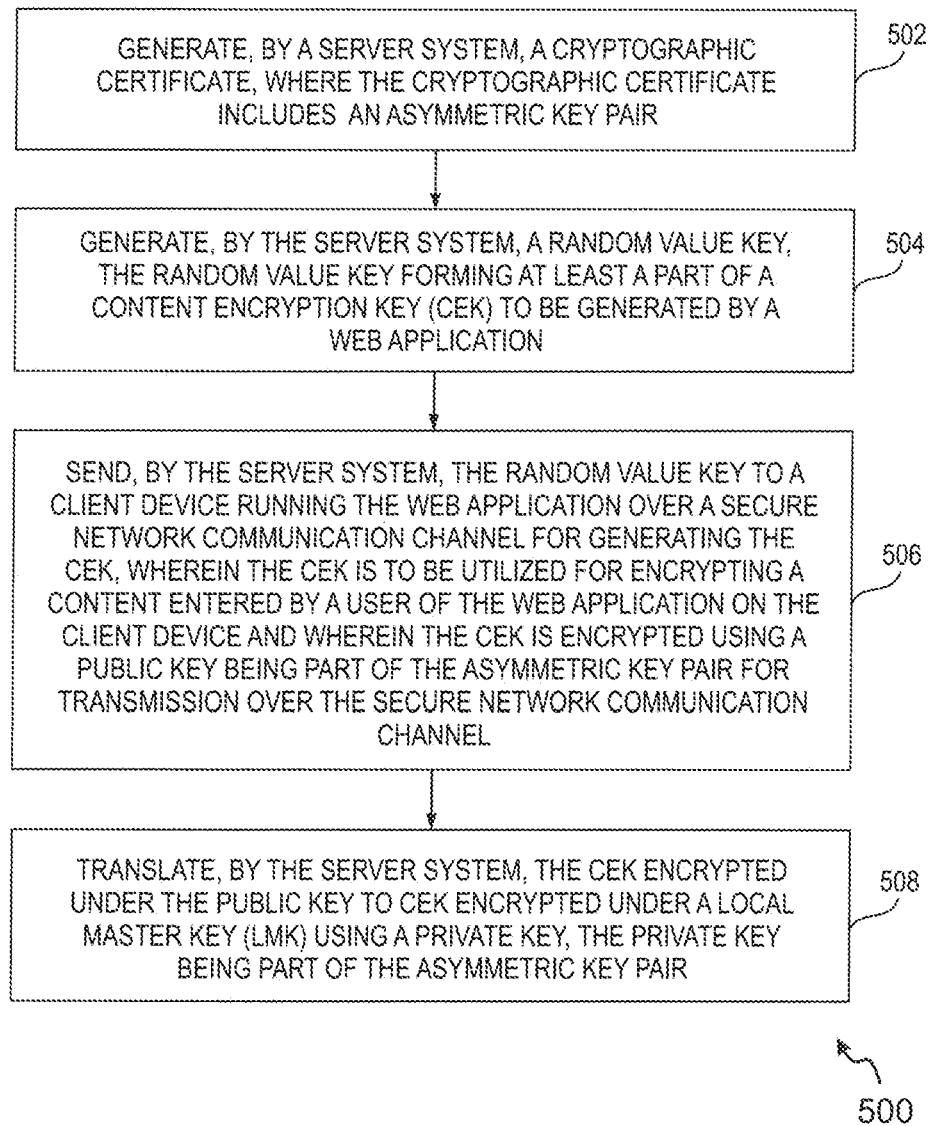
FIG. 5 illustrates a flow diagram of a method for encrypting data for a web application, in accordance with an example embodiment.

FIG. 5 illustrates a flow diagram of a method 500 for encrypting data for web application, in accordance with an example embodiment. The method 500 depicted in the flow diagram may be executed by, for example, the at least one server system such as a digital wallet server, an acquirer server, an issuer server, an ecommerce server, a payment server and the like. Further, the server system may include a HSM for encrypting and decrypting data for the web application. The Operations of the flow diagram 500, and combinations of operation in the flow diagram 500, may be implemented by, for example, hardware, firmware, a processor, circuitry and/or a different device associated with the execution of software that includes one or more computer program instructions. The method 500 starts at operation 502.

At 502, the method 500 includes generating, by a server system, a cryptographic certificate. The cryptographic certificate includes an asymmetric key pair. In a preferred embodiment, Rivest Shamir Adleman (RSA) encryption algorithm is used to generate the asymmetric key pair. In various embodiments, other asymmetric encryption algorithms may be used. Some examples include Diffie-Hellman key agreement algorithm, Elliptic Curve Cryptography (ECC), El Gamal, Digital Signature Algorithm (DSA) and the like.

At 504, the method 500 includes, generating, by the server system, a random value key, where the random value key forms at least a part of a Content Encryption Key (CEK) to be generated by a web application. In an embodiment, any of Pseudo Random Number Generator (PRNG) algorithms such as Lagged Fibonacci generators or linear feedback shift registers may be used to generate the random value key.

At 506, the method 500 includes sending, by the server system, the random value key to a client device running the web application over a secure network communication channel for generating the CEK. The CEK is to be utilized for encrypting a content entered by a user of the web application on the client device. Further, the CEK is encrypted using a public key being part of the asymmetric key pair for transmission over the secure network communication channel.

At 508, the method 500 includes translating, by the server system, the CEK encrypted under public key to CEK encrypted under LMK using a private key being part of the asymmetric key pair. The method completes at operation 508.

Figure 6:
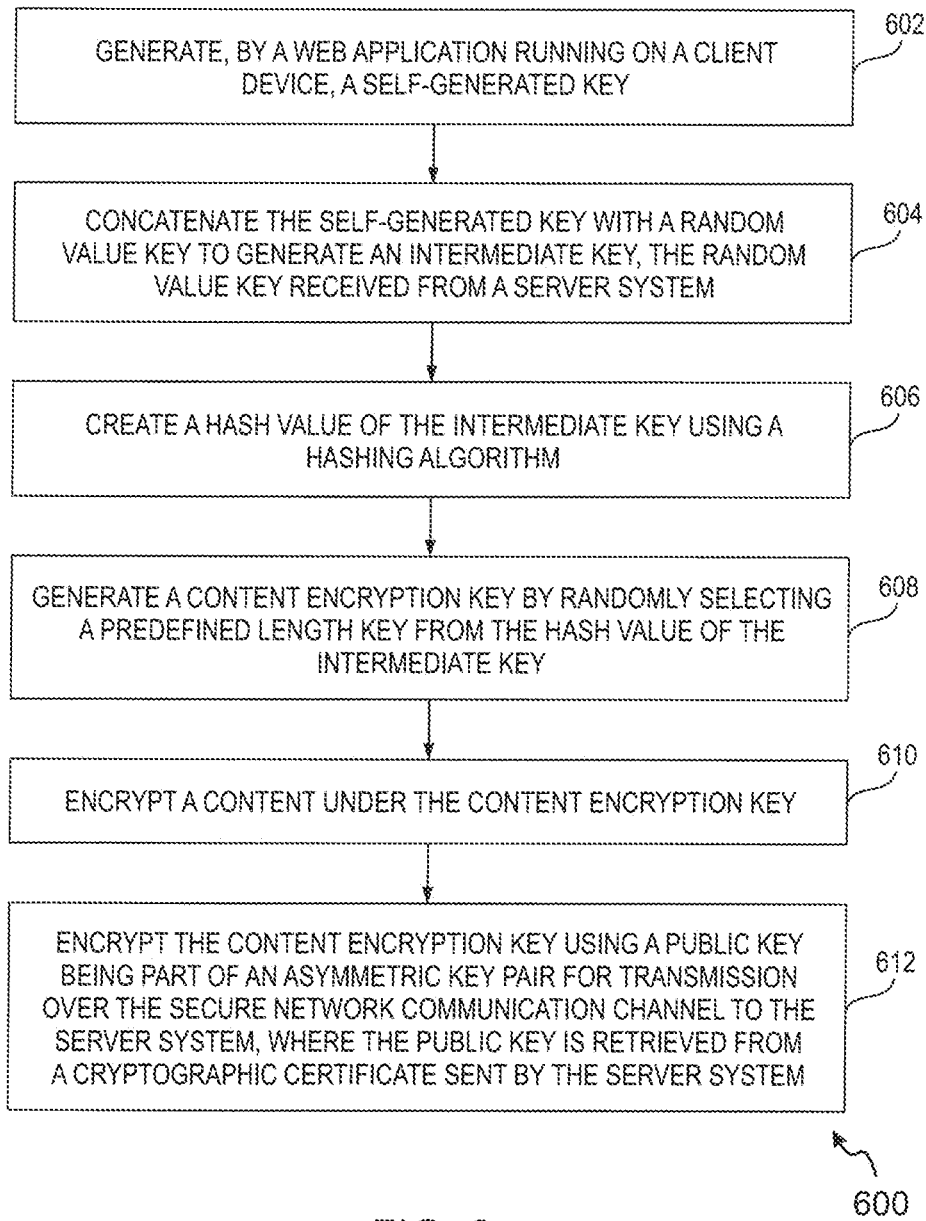
FIG. 6 illustrates a flow diagram of another method for encrypting data for a web application, in accordance with an example embodiment.

FIG. 6 illustrates a flow diagram of another method 600 for encrypting data for web application, in accordance with an example embodiment. The method 600 depicted in the flow diagram may be executed by, for example, by a web application running on a client device (e.g., the client device 102 of FIG. 1) such as a payment transaction application. Operations of the method 600, and combinations of operation in the method 600, may be implemented by, for example, hardware, firmware, a processor, circuitry and/or a different device associated with the execution of software that includes one or more computer program instructions. The method 600 starts at operation 602.

At 602, the method 600 includes generating a self-generated key, by a web application running on a client device.

At 604, the method 600 includes, concatenating the self-generated key with a random value key to generate an intermediate key, where the random value key is received from a server system. In an embodiment, the server system includes an application server facilitating the web application on the client device and a hardware security module communicably coupled to the application server.

At 606, the method 600 includes creating a hash value of the intermediate key using a hashing algorithm.

At 608, the method 600 includes generating a CEK by randomly selecting a predefined length key from the hash value of the intermediate key.

At 610, the method 600 includes encrypting a content under the CEK.

At 612, the method 600 includes encrypting the CEK using a public key being part of an asymmetric key pair for transmission over the secure network communication channel to the server system. The public key is retrieved from a cryptographic certificate sent by the server system. The method ends at operation 612.

Figure 7:
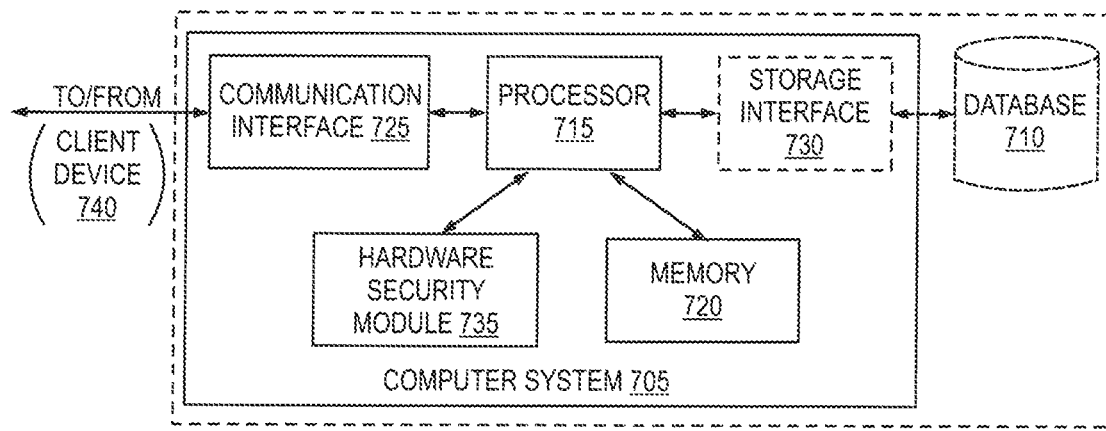
FIG. 7 is a simplified block diagram of a server system configured to encrypt data for a web application, in accordance with one embodiment of the present disclosure.

FIG. 7 is a simplified block diagram of a server system 700 configured to encrypt data for a web application, in accordance with one embodiment of the present disclosure. The server system 700 is an example of a server system that includes the application server 106 operably connected to the hardware security module 104 of FIG. 1. Examples of the server system 700 includes, but not limited to, an acquirer server, an issuer server, a digital wallet server, a payment server and the like connected to a hardware security module. The server system 700 includes a computer system 705 and a database 710. The computer system 705 includes a processor 715 for executing instructions. Instructions may be stored in, for example, but not limited to, a memory 720. The processor 715 may include one or more processing units (e.g., in a multi-core configuration). The processor 715 is operatively coupled to a communication interface 725 such that the computer system 705 can communicate with a client device 740 (e.g., the client device 102). For example, the communication interface 725 may receive data/content from the web client running on the client device 740.

The processor 715 may also be operatively coupled to the database 710. The database 710 is any computer-operated hardware suitable for storing and/or retrieving data. The database 710 may include multiple storage units such as hard disks and/or solid-state disks in a redundant array of inexpensive disks (RAID) configuration. The database 710 may include, but not limited to, a storage area network (SAN) and/or a network attached storage (NAS) system. In some embodiments, the database 710 is integrated within the computer system 705. For example, the computer system 705 may include one or more hard disk drives as the database 710. In other embodiments, the database 710 is external to the computer system 705 and may be accessed by the computer system 705 using a storage interface 730. The storage interface 730 is any component capable of providing the processor 715 with access to the database 710. The storage interface 730 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 715 with access to the database 710.

The computer system 705 further includes a hardware security module (HSM) 735 configured to generate asymmetric key pair and a random value key to be used by the client device 740 for encrypting a content. The HSM 735 is an example of the HSM 104 described with reference to FIG. 1. The HSM 735 is further configured to decrypt the encrypted content using the private key part of the asymmetric key pair for content validation. The processor 715 is configured to send the public part of the asymmetric key to the web client running on the client device 740 via the communication interface 725. Further, the server system 700 is configured to facilitate a UI on the client device 740 using which the user of the web application can enter a content. The processor 715 is also configured to validate the cryptographic certificate generated by the HSM 735 before retrieving the public key from the certificate.

In an embodiment, the communication interface 725 is capable of facilitating operative communication with the client device 740 (e.g., the client device 102) using API calls. The communication may be achieved over a communication network, such as the network 108. The components of the server system 700 provided herein may not be exhaustive, and that the server system 700 may include more or fewer components than that of depicted in FIG. 7. Further, two or more components may be embodied in one single component, and/or one component may be configured using multiple sub-components to achieve the desired functionalities. Some components of the server system 700 may be configured using hardware elements, software elements, firmware elements and/or a combination thereof.

Figure 8:
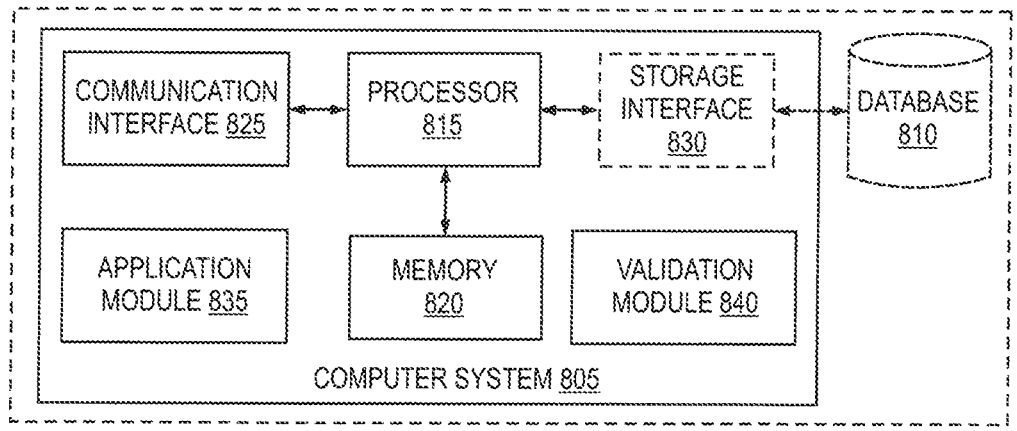
FIG. 8 is a simplified block diagram of another server system used for encrypting data for a web application, in accordance with one embodiment of the present disclosure.

FIG. 8 is a simplified block diagram of another server system 800 used for encrypting data of a web application, in accordance with one embodiment of the present disclosure. The server system 800 is an example of the application server 106 of FIG. 1. The server system 800 includes a computer system 805 and a database 810. The computer system 805 includes a processor 815 for executing instructions. Instructions may be stored in, for example, but not limited to, a memory 820. The processor 815 may include one or more processing units (e.g., in a multi-core configuration). The processor 815 is operatively coupled to a communication interface 825 such that the computer system 805 can communicate with the client device 102 as well as the HSM 104 of FIG. 1. For example, the communication interface 825 may receive the encrypted content from the client device 102 and forward the encrypted content to the HSM 104 for decryption.

The processor 815 may also be operatively coupled to the database 810. The database 810 is any computer-operated hardware suitable for storing and/or retrieving data. The database 810 may include multiple storage units such as hard disks and/or solid-state disks in a redundant array of inexpensive disks (RAID) configuration. The database 810 may include, but not limited to, a storage area network (SAN) and/or a network attached storage (NAS) system. In some embodiments, the database 810 is integrated within the computer system 805. For example, the computer system 805 may include one or more hard disk drives as the database 810. In other embodiments, the database 810 is external to the computer system 805 and may be accessed by the computer system 805 using a storage interface 830. The storage interface 830 is any component capable of providing the processor 815 with access to the database 810. The storage interface 830 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 815 with access to the database 810.

The computer system 805 further includes an application module 835. The application module 835 is configured to implement features of the application on the client device 102 upon installation. As an example, the application may be a payment transaction application or a cardholder portal such as the CHP 302 of FIG. 3. The application module 835 may be configured to receive content entered by the user using the UI facilitated by the communication interface 825 on the client device 102. The application module 835 further sends response to the client device 102. The application module 835 may be configured to enable the client device 102 to generate the CEK at the client end. The computer system 805 further includes a validation module 840. The validation module 840 is configured to validate the cryptographic certificate generated by the HSM based on one or more parameters as explained with reference to FIG. 2.

In one embodiment, the communication interface 825 includes a transceiver for wirelessly communicating information to, or receiving information from, the remote devices or other suitable display device, and/or another type of remote processing device. In another embodiment, the communication interface 825 is capable of facilitating operative communication with the remote devices and a cloud server using Application Program Interface (API) calls. The communication may be achieved over a communication network, such as the network 108. The components of the server system 800 provided herein may not be exhaustive, and that the server system 800 may include more or fewer components than that of depicted in FIG. 8. Further, two or more components may be embodied in one single component, and/or one component may be configured using multiple sub-components to achieve the desired functionalities. Some components of the server system 800 may be configured using hardware elements, software elements, firmware elements and/or a combination thereof.

Figure 9:
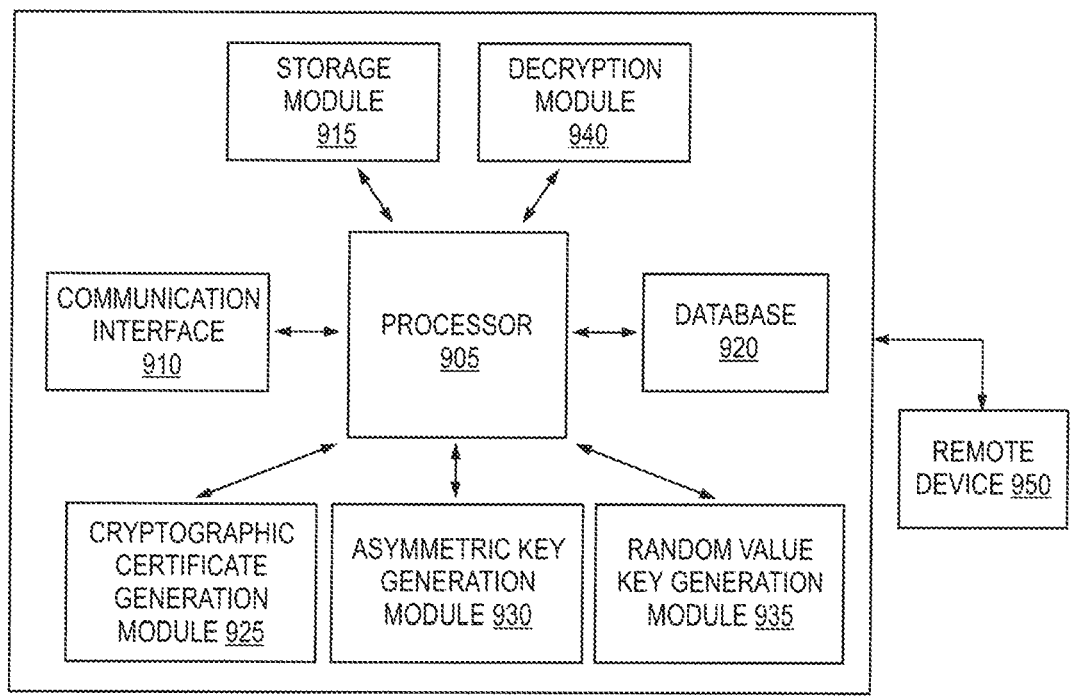
FIG. 9 is a simplified block diagram of a hardware security module used for encrypting data for a web application, in accordance with one embodiment of the present disclosure.

FIG. 9 is a simplified block diagram of a hardware security module 900 (HSM 900) used for encrypting data for a web application, in accordance with one embodiment of the present disclosure. The HSM 900 includes at least one processor 905 communicably coupled to a communication interface 910, a storage module 915, a database 920, a cryptographic certificate generation module 925, an asymmetric key generation module 930, a random value key generation module 935 and a decryption module 940. In at least one embodiment, the HSM 900 may be accessible to remote devices, such as a remote device 950 (e.g., the application server 700, the client device 102), through a communication network, such as the network 108.

The processor 905 is capable of executing the stored machine executable instructions in the storage module 915 or within the processor 905 or any storage location accessible to the processor 905. The cryptographic certificate generation module 925 generates a cryptographic certificate to be distributed to a web client. The asymmetric key generation module 930 generates a pair of keys i.e. a public key and a private key. The processor 905 is configured to bind the public key with the cryptographic certificate for distributing with the web client. The random value key generation module 935 generates a predetermined length random value key to be used by the web client for generating the CEK. The processor 905 is configured to include one or more encryption and decryption algorithms to be used by various modules of the HSM 900. For example, the processor 900 includes Rivest Shamir Adleman (RSA) encryption algorithm, Diffie-Hellman key agreement algorithm, Elliptic Curve Cryptography (ECC), El Gamal, Digital Signature Algorithm (DSA), Lagged Fibonacci generators, linear feedback shift registers and the like.

Further, the processor 905 is configured to perform different encryption and decryption functions such as including, but not limited to, symmetric block ciphers, padding schemes for public-key system, one-way hash functions, message authentication codes, cipher constructions based on hash functions, prime number generation and verification and the like. The processor 905 is configured to send the random value key and the cryptographic certificate to the remote device 950 such as the application server 106 via the communication interface 910. The decryption module 940 includes one or more decryption algorithms for decrypting the content offset from the encrypted content received under the SSL pipeline. The processor 905 is configured to validate the content offset with the original content.

In an embodiment, the processor 905 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

In an embodiment, the HSM 900 may include an input/output module (I/O module) (not shown) configured to receive inputs from and provide outputs to the end-user. For instance, the I/O module may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like.

The storage module 915 can be any type of storage accessible to the processor 905. The storage module 915 may include volatile or non-volatile memories, or a combination thereof. In some non-limiting examples, the storage module 915 can be four to sixty-four Megabytes (MB) of Dynamic Random Access Memory ("DRAM") or Static Random Access Memory ("SRAM"). In addition, some examples may include supplementary flash memory installed via a PCMCIA slot.

Figure 10:
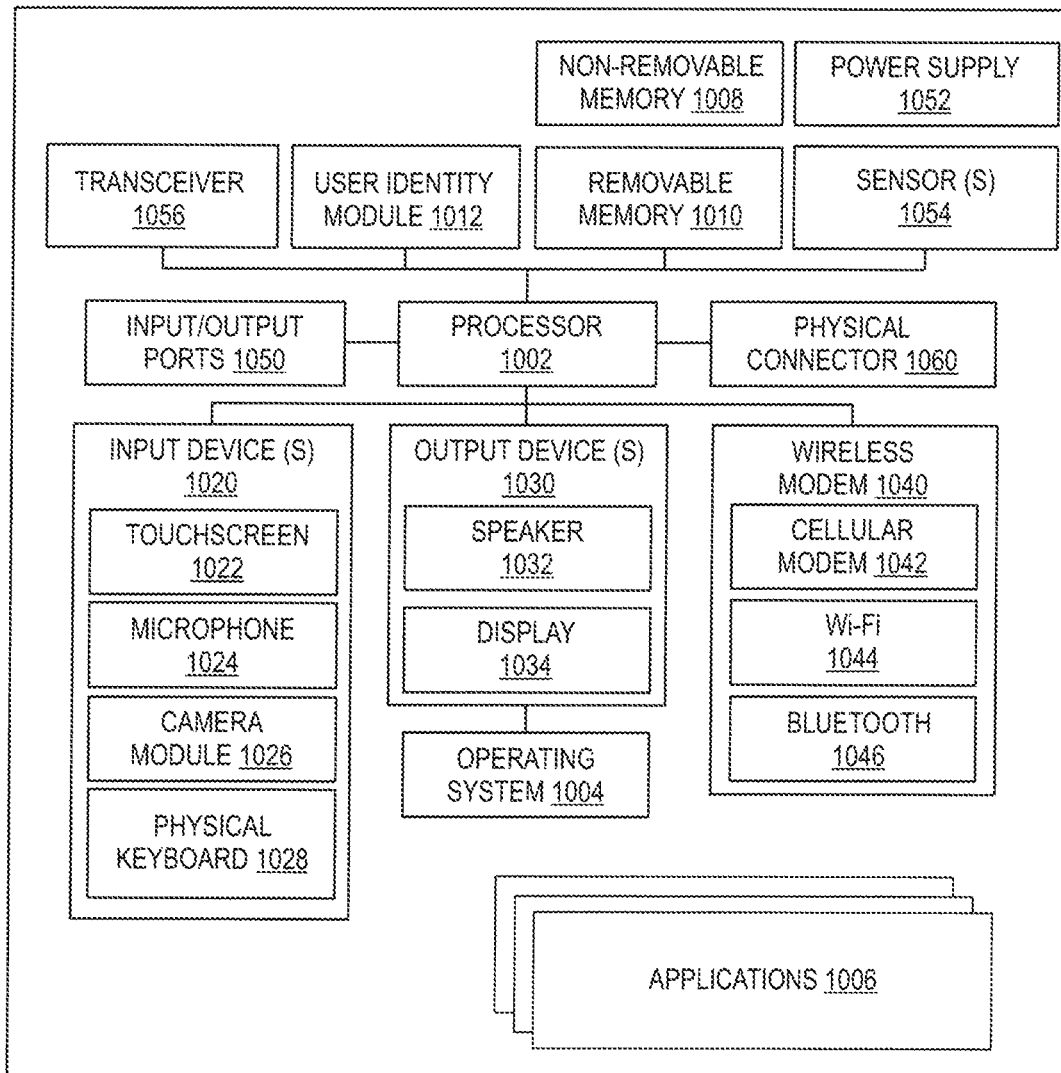
FIG. 10 shows simplified block diagram of a client device capable of implementing at least some embodiments of the present disclosure.

FIG. 10 shows simplified block diagram of a client device 1000 capable of implementing at least some embodiments of the present disclosure. For example, the client device 1000 may correspond to the client device 740 (e.g., the client device 102 of FIG. 1) of FIG. 7. The client device 1000 is depicted to include one or more applications 1006.

It should be understood that the client device 1000 as illustrated and hereinafter described is merely illustrative of one type of device and should not be taken to limit the scope of the embodiments. As such, it should be appreciated that at least some of the components described below in connection with that the client device 1000 may be optional and thus in an example embodiment may include more, less or different components than those described in connection with the example embodiment of the FIG. 10. As such, among other examples, that the client device 1000 could be any of a mobile electronic devices, could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated client device 1000 includes a controller or a processor 1002 (e.g., a signal processor, microprocessor, ASIC, or other control and processing logic circuitry) for performing such tasks as signal coding, data processing, image processing, input/output processing, power control, and/or other functions. An operating system 1004 controls the allocation and usage of the components of the client device 1000 and support for one or more applications programs (see, the applications 1006), that implement one or more of the innovative features described herein. The applications 1006 may include payment based application and/or any common mobile computing applications (e.g., telephony applications, email applications, calendars, contact managers, web browsers, messaging applications) or any other computing application. The healthcare delivery application, in at least one example embodiment, may be configured to provide the logic to display/retrieve/share relevant medical multimedia data of a patient during a medical procedure, as explained with reference to FIGS. 1 to 9.

The illustrated client device 1000 includes one or more memory components, for example, a non-removable memory 1008 and/or a removable memory 1010. The non-removable memory 1008 and/or the removable memory 1010 may be collectively known as database in an embodiment. The non-removable memory 1008 can include RAM, ROM, flash memory, a hard disk, or other well-known memory storage technologies. The removable memory 1010 can include flash memory, smart cards, or a Subscriber Identity Module (SIM). The one or more memory components can be used for storing data and/or code for running the operating system 1004 and the applications 1006. The client device 1000 may further include a user identity module (UIM) 1012. The UIM 1012 may be a memory device having a processor built in. The UIM 1012 may include, for example, a subscriber identity module (SIM), a universal integrated circuit card (UICC), a universal subscriber identity module (USIM), a removable user identity module (R-UIM), or any other smart card. The UIM 1012 typically stores information elements related to a mobile subscriber. The UIM 1012 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The client device 1000 can support one or more input devices 1020 and one or more output devices 1030. The input devices 1020 and the output devices 1030 configure the input/output (I/O) module for the client device 1000. Examples of the input devices 1020 may include, but are not limited to, a touch screen/a display screen 1022 (e.g., capable of capturing finger tap inputs, finger gesture inputs, multi-finger tap inputs, multi-finger gesture inputs, or keystroke inputs from a virtual keyboard or keypad), a microphone 1024 (e.g., capable of capturing voice input), a camera module 1026 (e.g., capable of capturing still picture images and/or video images) and a physical keyboard 1028. Examples of the output devices 1030 may include, but are not limited to a speaker 1032 and a display 1034. Other possible output devices can include piezoelectric or other haptic output devices. Some devices can serve more than one input/output function. For example, the touch screen 1022 and the display 1034 can be combined into a single input/output device.

A wireless modem 1040 can be coupled to one or more antennas (not shown in the FIG. 10) and can support two-way communications between the processor 1002 and external devices, as is well understood in the art. The wireless modem 1040 is shown generically and can include, for example, a cellular modem 1042 for communicating at long range with the mobile communication network, a Wi-Fi compatible modem 1044 for communicating at short range with an external Bluetooth-equipped device or a local wireless data network or router, and/or a Bluetooth-compatible modem 1046. The wireless modem 1040 is typically configured for communication with one or more cellular networks, such as a GSM network for data and voice communications within a single cellular network, between cellular networks, or between the client device 1000 and a public switched telephone network (PSTN). The wireless modem 1040 may in at least one example embodiment configure the communication module of the client device 1000.

The client device 1000 can further include one or more input/output ports 1050, a power supply 1052, one or more sensors 1054 for example, an accelerometer, a gyroscope, a compass, or an infrared proximity sensor for detecting the orientation or motion of the client device 1000, a transceiver 1056 (for wirelessly transmitting analog or digital signals) and/or a physical connector 1060, which can be a USB port, IEEE 1294 (FireWire) port, and/or RS-232 port. The illustrated components are not required or all-inclusive, as any of the components shown can be deleted and other components can be added.

The disclosed method with reference to FIGS. 5 and 6, or one or more operations of the methods 500 and 600 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 700 and its various components such as the computer system 705 and the database 710 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
generating, by a server system, a cryptographic certificate, the cryptographic certificate comprising an asymmetric key pair;
generating, by the server system, a random value key, the random value key forming at least a part of a Content Encryption Key (CEK) to be generated by a web application;
sending, by the server system, the random value key to a client device running the web application over a secure network communication channel for generating the CEK, wherein the CEK is to be utilized for encrypting a content entered by a user of the web application on the client device and wherein the CEK is encrypted using a public key being part of the asymmetric key pair for transmission over the secure network communication channel; and
translating, by the server system, the CEK encrypted under the public key to CEK encrypted under a Local Master Key (LMK) using a private key, the private key being part of the asymmetric key pair.

2. The method as claimed in claim 1, wherein the private key is encrypted under the LMK of a Hardware Security Module (HSM).

3. The method as claimed in claim 1, wherein the random value key is a sixteen byte long key.

4. The method as claimed in claim 1, wherein the secure network communication channel is established according to at least one of: a Secure Socket Layer (SSL) protocol; and a Transport Layer Security (TLS) protocol.

5. The method as claimed in claim 1, further comprising:
sending the cryptographic certificate to the client device for retrieval of the public key being part of the asymmetric key pair; and
validating the cryptographic certificate prior to retrieving the public key.

6. The method as claimed in claim 5, wherein the cryptographic certificate is validated based on one or more parameters, the one or more parameters comprising:
validity of a start date and an end date of the cryptographic certificate;
validity of a certificate chain up to a subordinate certificate authority;
validity of certificate extension, a certificate revocation list (CRL), an Online Certificate Status Protocol (OCP), and a key usage frequency; and
validity of a distributed name.

7. The method as claimed in claim 1, wherein the CEK is generated by the web application at the client device by randomly selecting a predefined length key from a hash value of an intermediate key, wherein the hash value is generated using a hashing algorithm and wherein the predefined length key is 16 byte long.

8. The method as claimed in claim 7, wherein the intermediate key is generated by concatenating a self-generated key with the random value key, the self-generated key formed by the web application at the client device.

9. The method as claimed in claim 8, wherein the self-generated key is 16 byte long.

10. The method as claimed in claim 1, further comprising:
generating a content offset using the CEK encrypted under the LMK and content encrypted under the LMK.

11. The method as claimed in claim 10, wherein the content offset is matched with an original content entered by the user of the web application for validation.

12. The method as claimed in claim 1, wherein the content is a Personal Identification Number (PIN) of a payment card.

13. The method as claimed in claim 1, wherein the server system is a payment server of a payment network, and wherein the content includes at least one of a login ID, a password, a Card Verification Value (CVV) and a payment related data.

14. A server system, the server system comprising:
a communication interface configured to establish a secure network communication channel with a client device running a web application;
a memory comprising executable instructions;
a hardware security module (HSM) configured to
generate a cryptographic certificate, the cryptographic certificate comprising an asymmetric key pair comprising a public key and a private key,
generate a random value key forming at least a part of a Content Encryption Key (CEK) to be generated by the web application, and
translate the CEK encrypted under the public key to CEK encrypted under a Local Master Key (LMK) using the private key; and
a processor communicably coupled to the communication interface, the processor configured to execute the instructions to cause the server system to at least send the random value key to the client device running the web application over the secure network communication channel for generating the CEK, wherein the CEK is to be utilized for encrypting a content entered by a user of the web application on the client device and wherein the CEK is encrypted using the public key of the asymmetric key pair for transmission over the secure network communication channel.

15. The server system as claimed in claim 14, wherein the private key is encrypted under the LMK of the HSM.

16. The server system as claimed in claim 14, wherein the secure network communication channel is established according to at least one of: a Secure Socket Layer (SSL) protocol; and a Transport Layer Security (TLS) protocol.

17. The server system as claimed in claim 14, wherein the server system is further caused to:
send the cryptographic certificate to the client device for retrieval of the public key being part of the asymmetric key pair; and
validate the cryptographic certificate prior to retrieving the public key.

18. The server system as claimed in claim 17, wherein the cryptographic certificate is validated based on one or more parameters, the one or more parameters comprising:
validity of a start date and an end date of the cryptographic certificate;
validity of a certificate chain up to a subordinate certificate authority;
validity of certificate extension, a certificate revocation list (CRL), an Online Certificate Status Protocol (OCP), and a key usage frequency; and
validity of a distributed name.

19. The server system as claimed in claim 14, wherein the CEK is generated by the web application at the client device by randomly selecting a predefined length key from a hash value of an intermediate key, wherein the hash value is generated using a hashing algorithm and wherein the predefined length key is a 16 byte long key.

20. A computer-implemented method, comprising: generating, by a web application running on a client device, a self-generated key;
concatenating the self-generated key with a random value key to generate an intermediate key, the random value key received from a server system; creating a hash value of the intermediate key using a hashing algorithm;
generating a CEK by randomly selecting a predefined length key from the hash value of the intermediate key;
encrypting a content under the CEK;
encrypting the CEK using a public key being part of an asymmetric key pair for transmission over a secure network communication channel to the server system, wherein the public key is retrieved from a cryptographic certificate sent by the server system which generates the asymmetric key pair using a Hardware Security Module (HSM), and the server system translates the CEK encrypted under the public key to CEK encrypted under a Local Master Key (LMK) using a private key of the asymmetric key pair.

* * * * *